United States Patent
Maeshima et al.

(10) Patent No.: US 7,533,278 B2
(45) Date of Patent: May 12, 2009

(54) ELECTRONIC DEVICE AND POWER SAVING CONTROL METHOD

(75) Inventors: Shogo Maeshima, Ome (JP); Fumitaka Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 11/341,998

(22) Filed: Jan. 27, 2006

(65) Prior Publication Data
US 2006/0195710 A1    Aug. 31, 2006

(30) Foreign Application Priority Data
Feb. 28, 2005  (JP)  ............. 2005-053706

(51) Int. Cl.
G06F 1/20 (2006.01)
G06F 1/32 (2006.01)
(52) U.S. Cl. .................. 713/300; 713/322
(58) Field of Classification Search ........... 713/300, 713/320, 322, 323, 324, 600, 601
See application file for complete search history.

(56) References Cited

U.S. PATENT DOCUMENTS

| | | | | |
|---|---|---|---|---|
| 4,683,940 A | * | 8/1987 | Ernst et al. ............. | 165/272 |
| 6,044,473 A | * | 3/2000 | Kim ....................... | 713/320 |
| 6,681,336 B1 | | 1/2004 | Nakazato et al. | |
| 2002/0179284 A1 | * | 12/2002 | Joshi et al. ............ | 165/80.3 |
| 2004/0001316 A1 | | 1/2004 | Kamikawa et al. | |
| 2004/0133817 A1 | * | 7/2004 | Choi ....................... | 713/300 |
| 2005/0231983 A1 | * | 10/2005 | Dahm ..................... | 362/800 |

FOREIGN PATENT DOCUMENTS

| | | |
|---|---|---|
| JP | 11-17375 | 1/1999 |
| JP | 2000-315132 | 11/2000 |

* cited by examiner

*Primary Examiner*—Dennis M Butler
(74) *Attorney, Agent, or Firm*—Knobbe, Martens Olson & Bear LLP

(57) ABSTRACT

According to one embodiment, an EC/KBC reads data of an acceleration sensor. The EC/KBC determines whether a computer is in a top heat state. If the EC/KBC determines that the computer is in the top heat state, it notifies a BIOS stored in a BIOS-ROM of a message to this effect. The BIOS which is notified from the EC/KBC that the computer is in the top heat state notifies an OS (Operating System) of the message to this effect. The OS sets a CPU to a power saving mode by an existing means such as the power saving utility of the OS, and sets the computer to the power saving mode.

5 Claims, 9 Drawing Sheets

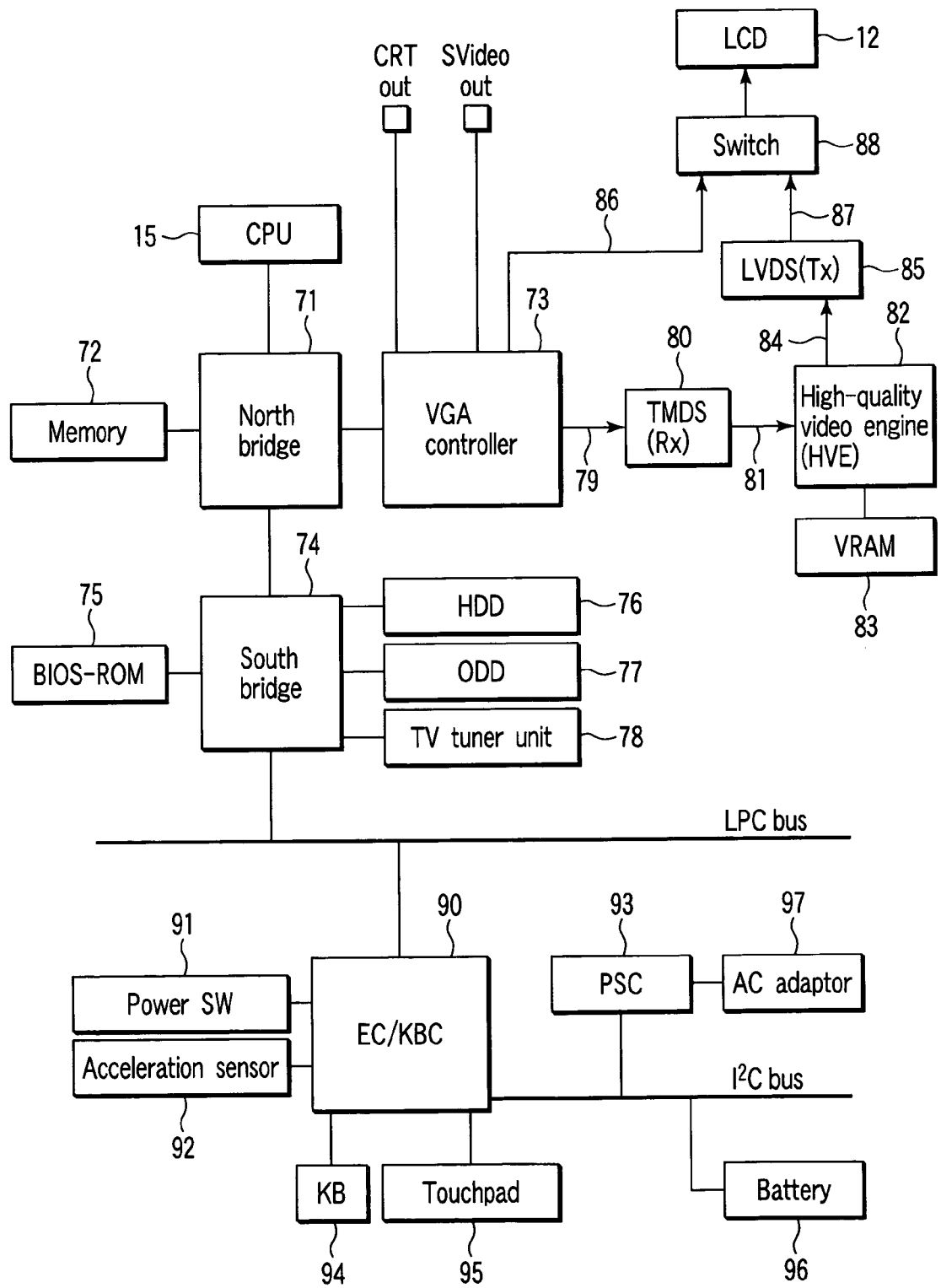
F I G. 8

ELECTRONIC DEVICE AND POWER SAVING CONTROL METHOD

CROSS-REFERENCE TO RELATED APPLICATIONS

This application is based upon and claims the benefit of priority from prior Japanese Patent Application No. 2005-053706, filed Feb. 28, 2005, the entire contents of which are incorporated herein by reference.

BACKGROUND

1. Field

One embodiment of the invention relates to an electronic device and, more particularly, to power saving control of the electronic device.

2. Description of the Related Art

These days, the heat generation amount of a CPU incorporated in an electronic device such as a notebook computer becomes larger. In order to diffuse heat from the CPU, heat is generally transferred to a radiating portion (heat sink, fan, or the like) via a heat pipe and diffused from the radiating portion. A liquid coolant is filled in the heat pipe. At one end of the heat pipe that is connected to a heat receiving portion, the internal liquid coolant evaporates by heat transferred from the CPU. The evaporated gas deprives the CPU of heat, and transfers heat to the radiating portion. The radiating portion condenses gas into a liquid coolant by thermal diffusion and cooling by a radiation fin, fan, or the like. The condensed liquid coolant returns to the end of the heat pipe on the side of the heat receiving portion by the action of, e.g., a wick (thin groove for moving the liquid coolant by capillarity) in the heat pipe, and the heat transfer process is repeated. In a normal device use state, the end of the heat pipe on the side of the radiating portion is desirably prevented from becoming much lower than an end on the side of the heat receiving portion in order to move the condensed liquid coolant from the radiating portion to the heat receiving portion. This structure can smoothly move the liquid coolant from the radiating portion to the heat receiving portion (see, e.g., Jpn. Pat. Appln. KOKAI Publication No. 11-17375 (FIGS. 1, 4, 6, and 7)).

The portability of most recent electronic devices has been improved, and they can generally operate even while they are carried. Depending on how the user carries the electronic device, the electronic device is not always in the above-described ideal use state in which the radiating-portion side of the heat pipe is higher than its heat receiving-portion side. For example, the electronic device may operate while the radiating-portion side of the heat pipe is lower than its heat receiving-portion side (which will be referred to as a top heat state hereinafter). In this case, the liquid coolant moves from the radiating portion to the heat receiving portion against gravity, and moves through the wick in the heat pipe against gravity. Therefore, the heat receiving-portion side of the heat pipe does not keep a sufficient amount of liquid coolant, and the original heat transfer ability degrades. If the amount of heat generated by the CPU is large in this state, all the liquid coolant on the heat receiving-portion side of the heat pipe evaporates, and the original heat transfer ability of the heat pipe is completely lost (this state is also called top heat). As a result, the electronic device must be completely turned off.

It is disclosed by, for example, Jpn. Pat. Appln. KOKAI Publication No. 11-17375 that a technique using a heat pipe which extends crosswise from a heat receiving portion. According to this technique, even when the device is inclined, a liquid coolant returns from one heat pipe portion of the cross-shaped heat pipe, and the heat transfer ability is maintained to a certain degree. However, the heat pipe disclosed in Jpn. Pat. Appln. KOKAI Publication No. 11-17375 requires a large installation area in the device, which is disadvantageous for cost, assembling, and the degree of freedom of design.

BRIEF SUMMARY OF THE INVENTION

According to an embodiment of the present invention, an electronic device comprises a body which incorporates a CPU, a sensor which is incorporated in the body and detects the posture of the body, and a controller which performs power saving control of the CPU in accordance with detection of the posture of the body by the sensor.

According to another embodiment of the present invention, a power saving control method for a CPU incorporated in a body of an electronic device comprises detecting the posture of the electrode device by a sensor incorporated in the body, and performing power saving control of the CPU in accordance with detection of the posture of the body by the sensor.

BRIEF DESCRIPTION OF THE SEVERAL VIEWS OF THE DRAWING

A general architecture that implements the various feature of the invention will now be described with reference to the drawings. The drawings and the associated descriptions are provided to illustrate embodiments of the invention and not to limit the scope of the invention.

FIG. 8 is a block diagram showing an example of the configuration of the electronic device according to the embodiment of the electronic device of the present invention;

DETAILED DESCRIPTION OF THE INVENTION

Various embodiments according to the invention will be described hereinafter with reference to the accompanying drawings. In general, according to one embodiment of the invention a preferred embodiment of the present invention will be described below with reference to the several views of the accompanying drawings.

Figure 1:
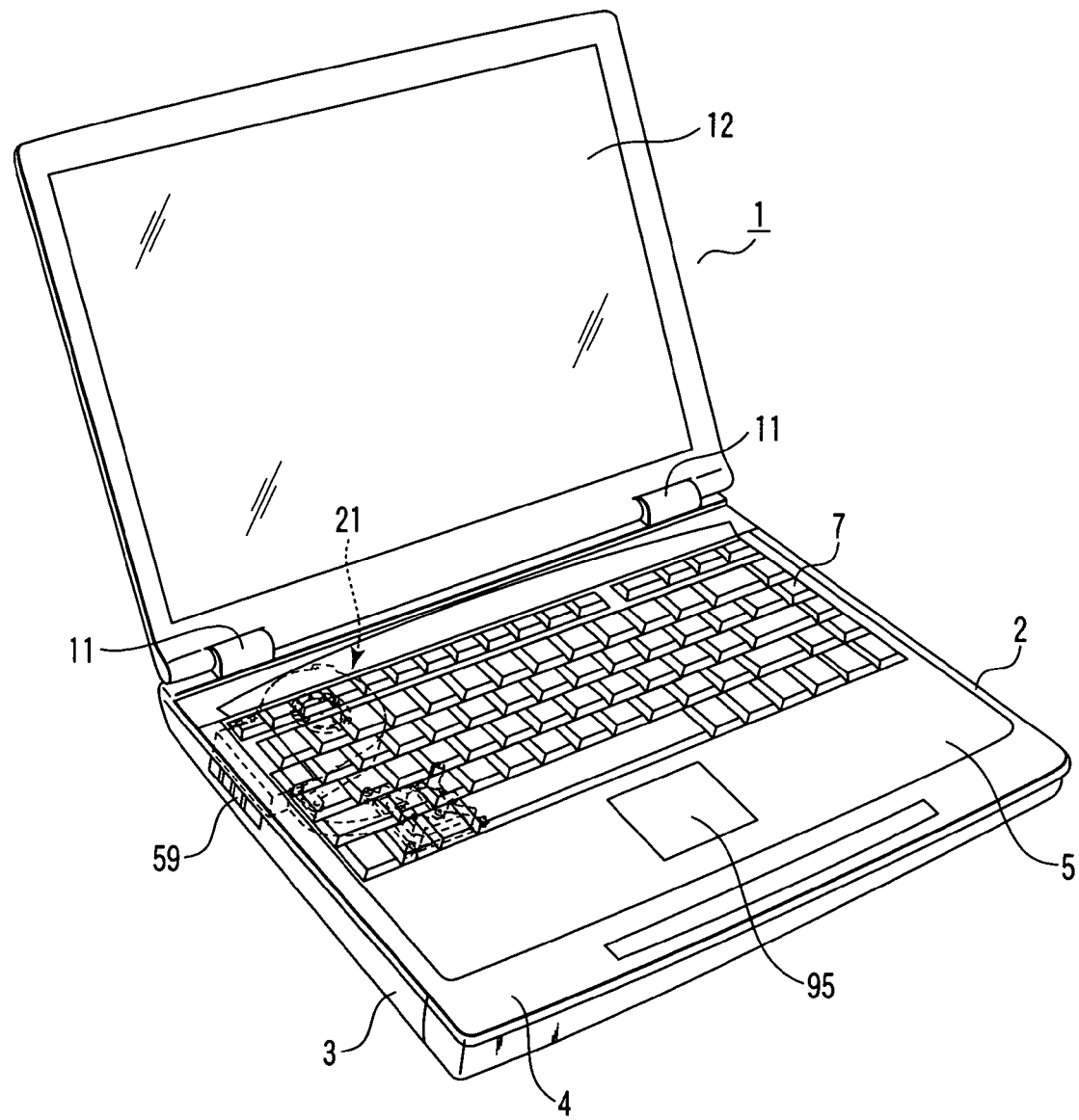
FIG. 1 is a perspective view showing an example of a portable computer as an embodiment of an electronic device according to an embodiment of the present invention.
Figure 2:
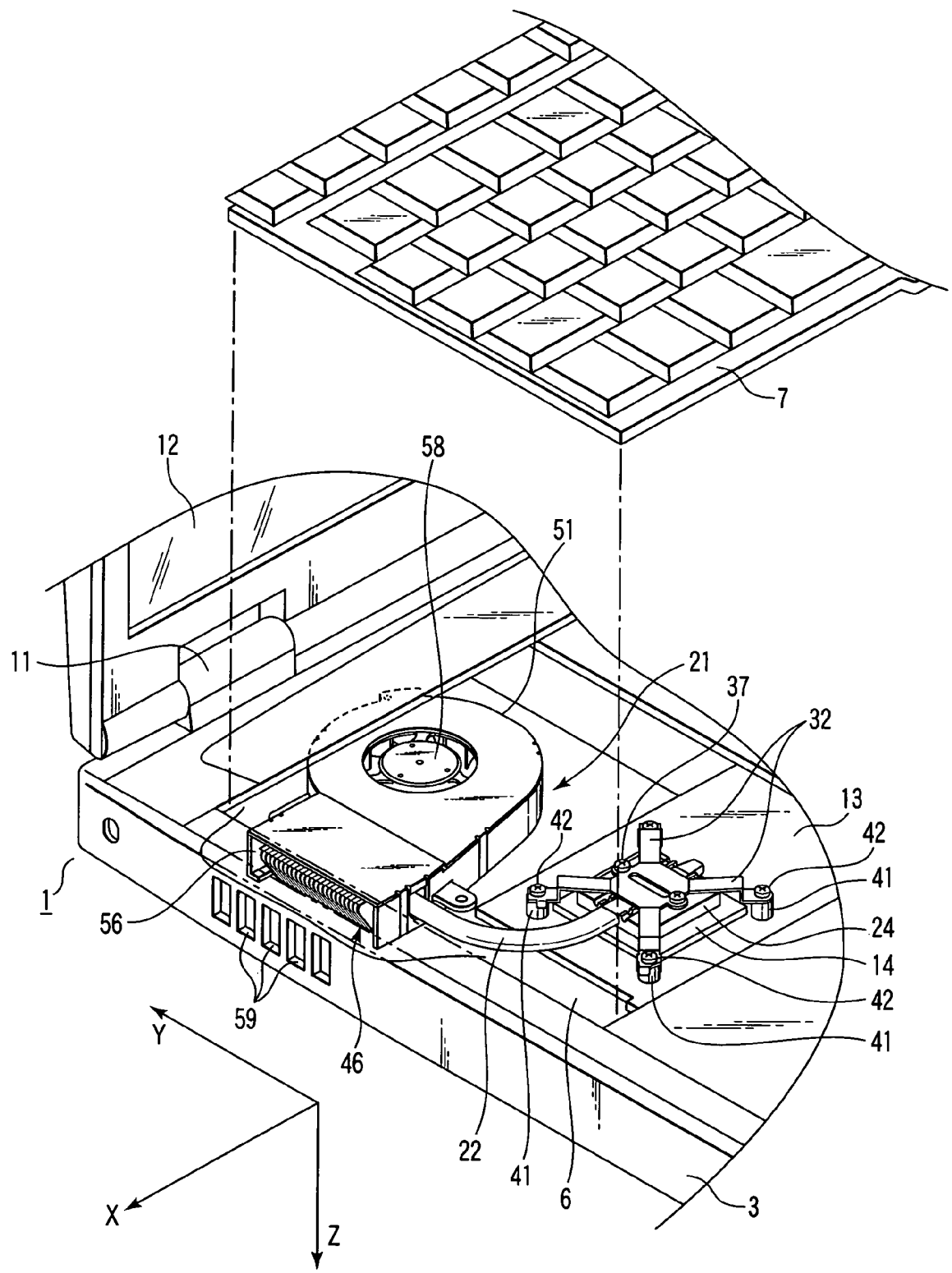
FIG. 2 is a perspective view showing an example of an interior at a portion of the portable computer at which a cooling device is arranged according to the embodiment.

According to an embodiment, FIGS. 1 and 2 show that a portable computer 1 serving as an electronic device has a device body 2. The device body 2 is formed from a case 3 and cover 4 into a box. The cover 4 has a palm rest 5, and a keyboard attaching portion 6 is formed on the back side of the palm rest 5. The keyboard attaching portion 6 is engaged at the front end with a keyboard 7, and attached at the rear end to the cover 4 with a screw (not shown).

A liquid crystal display (LCD) 12 serving as a display device is attached to the rear end of the cover 4 by a pair of hinges 11 so that the LCD 12 can be opened/closed. The device body 2 incorporates a wiring board 13, as shown in FIG. 2.

Figure 3:
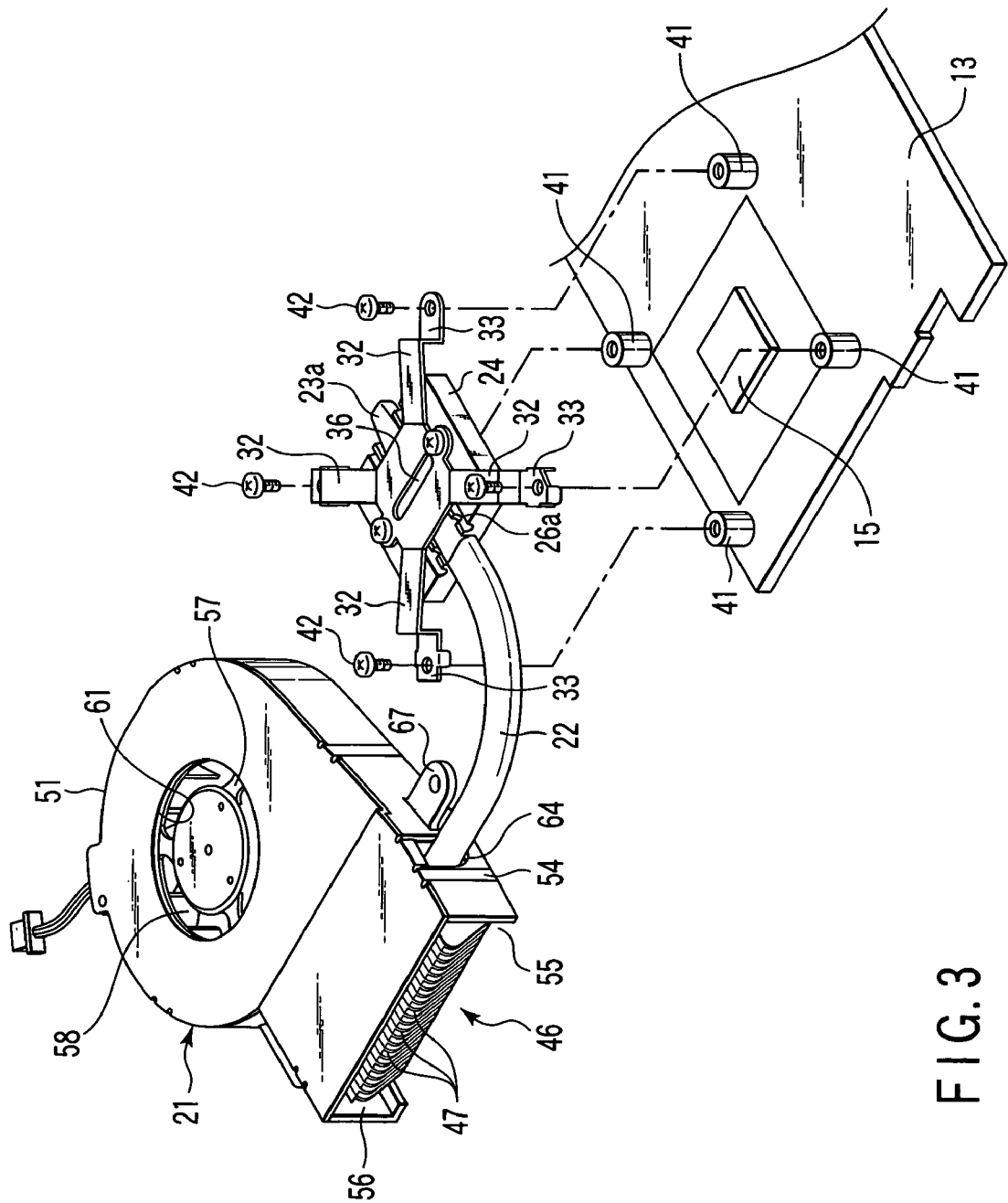
FIG. 3 is a perspective view showing an example of the cooling device and an example of a portion of a wiring board at which an electronic component is arranged according to the embodiment.

As shown in FIGS. 2 and 3, the wiring board 13 has a socket 14, and an electronic component, e.g., a CPU 15 serving as a heating portion is mounted on the socket 14. Since the CPU 15 generates heat along with operation, it is forcibly cooled by a cooling device 21 mounted on the wiring board 13.

As shown in FIGS. 2 to 5, the cooling device 21 has a heat pipe 22 serving as a heat transfer means. The heat pipe 22 has first and second ends 23a and 23b, and a curved portion 23c is formed between these ends. At the curved portion 23c, the first and second ends 23a and 23b form an angle of almost 90°.

Figure 5:
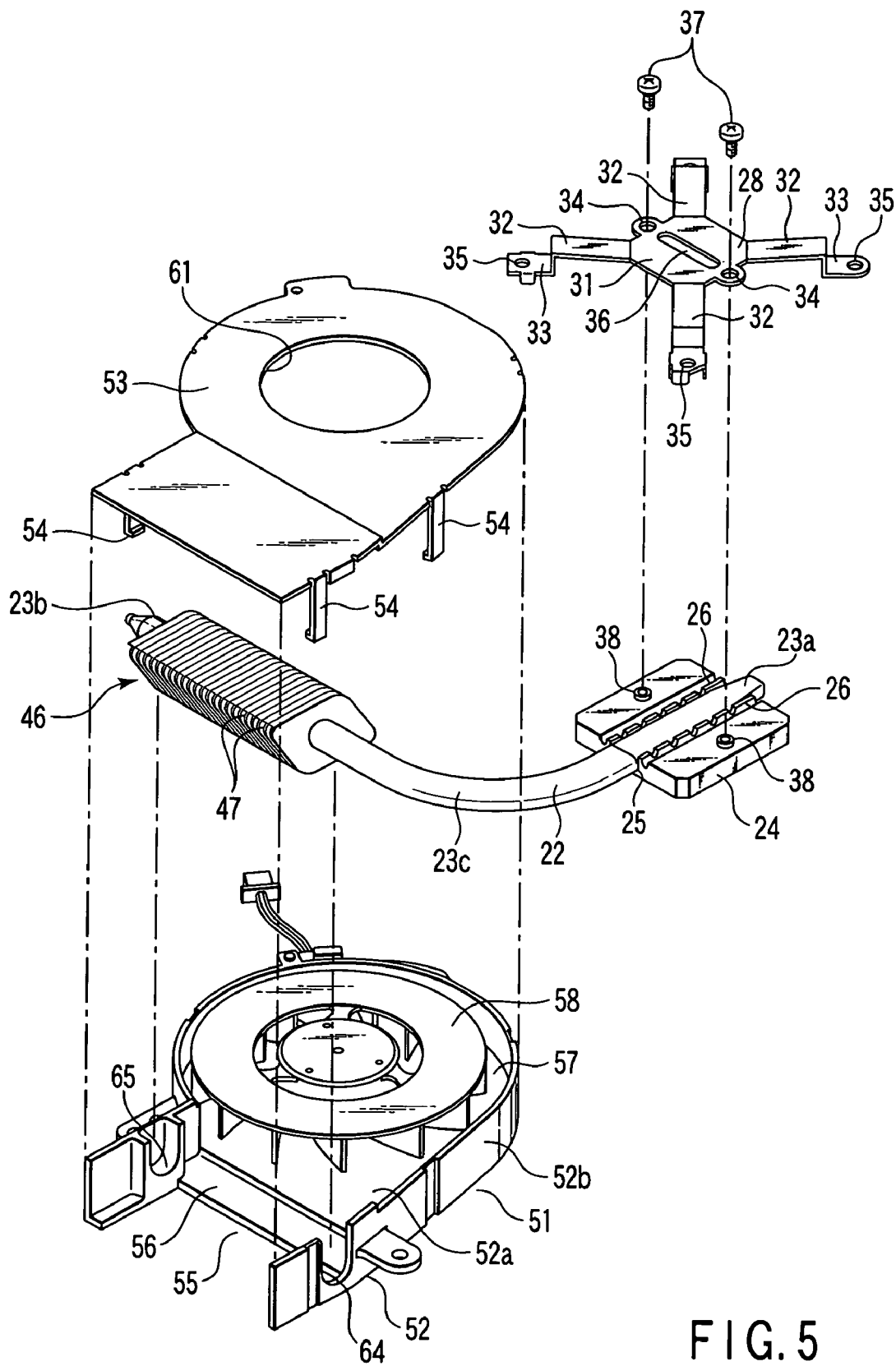
FIG. 5 is an exploded perspective view showing the example of the cooling device according to the embodiment.
Figure 7:
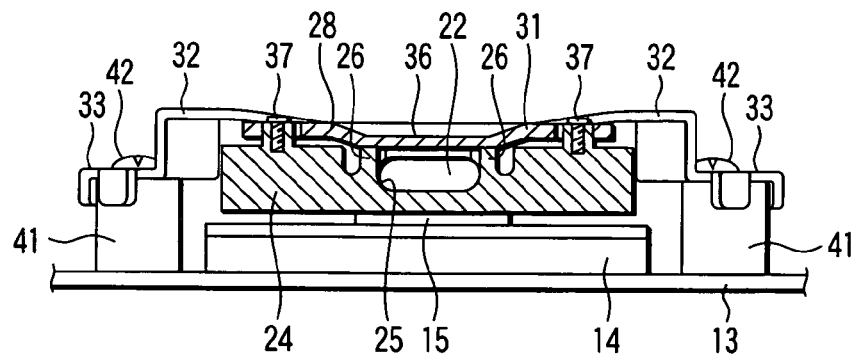
FIG. 7 is a sectional view showing an example of a state in which a heat receiving portion is joined to the electronic component and attached to the wiring board according to the embodiment.

A heat receiving portion 24 which is formed of a metal having a high thermal conductivity such as aluminum and shaped into a rectangular plate is attached to the first end 23a of the heat pipe 22. As shown in FIGS. 5 and 7, at the center of one surface of the heat receiving portion 24, an attaching groove 25 is formed over the full length of the heat receiving portion 24 in a direction perpendicular to a predetermined direction. Projecting portions 26 are formed on the two sides of the attaching groove 25.

The first end 23a of the heat pipe 22 is fitted in the attaching groove 25 via a heat transfer sheet (not shown), and fixedly coupled by caulking portions 26a obtained by partially caulking the projecting portions 26. Uncaulked portions of the projecting portions 26 have a height sufficient to project upward slightly from the heat pipe 22 which is fitted in the attaching groove 25, as shown in FIG. 7.

As shown in FIGS. 2 to 5, a spring member 28 is attached to one surface of the heat receiving portion 24. The spring member 28 has a rectangular base 31, and four legs 32 extending from the four corners of the base 31.

Each leg 32 curves upward toward its distal end from its proximal end which is arranged continuously from the base 31. The distal end of the leg 32 is bent into an L-shaped attaching portion 33. As shown in FIG. 5, the base 31 has a pair of first attaching holes 34 which are formed in the two ends of the base 31 in a predetermined direction, and each leg 32 has a second attaching hole 35.

A straight-shaped abutment portion 36 projects downward at the center of the base 31 along the predetermined direction of the base 31. The section of the abutment portion 36 in the widthwise direction has a curved shape such as a semicircular shape.

A pair of bosses 38 each having a threaded hole stand on one surface of the heat receiving portion 24. The base 31 is attached to one surface of the heat receiving portion 24 by screws 37 which are screwed in the bosses 38 via the pair of first attaching holes 34.

The diameter of the first attaching hole 34 is larger than the outer dimension of the boss 38, and the diameter of the head of the screw 37 is larger than the diameter of the first attaching hole 34. Hence, the base 31 of the spring member 28 which is attached to the heat receiving portion 24 by the screws 37 is attached to the heat receiving portion 24 with a backlash. When the base 31 is pressed against the heat receiving portion 24 (to be described later), the base 31 of the spring member 28 can swing at the abutment portion 36 serving as a fulcrum that contacts the projecting portions 26 of the heat receiving portion 24 and serves as a fulcrum.

Figure 6:
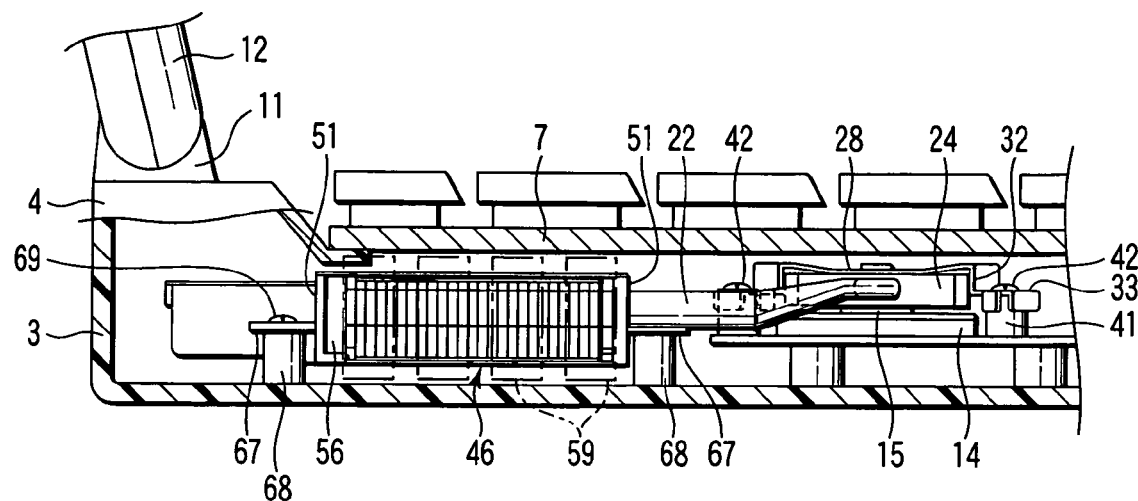
FIG. 6 is a sectional view showing an example of the portion of the portable computer at which the cooling device is arranged according to the embodiment.

As shown in FIGS. 2, 6, and 7, the attaching portions 33 at the distal ends of the legs 32 of the spring member 28 are attached and fixed to studs 41 on the wiring board 13 by screws 42 via the second attaching holes 35. The legs 32 are elastically deformed and attached to the wiring board 13. Since the abutment portion 36 formed on the base 31 elastically presses the projecting portions 26 of the heat receiving portion 24, the other surface of the heat receiving portion 24 tightly contacts, via a heat transfer sheet (not shown), the CPU 15 mounted on the wiring board 13.

The base 31 of the spring member 28 is attached to the heat receiving portion 24 with a backlash. When the legs 32 are attached to the studs 41 by the screws 42 to bring the base 31 into tight contact with the heat receiving portion 24, the abutment portion 36 serving as part of the base 31 contacts the projecting portions 26 of the heat receiving portion 24. As a result, the base 31 is fixed while swinging at the projecting portions 26 serving as fulcrums.

Since the spring member 28 can apply pressing force to the center of the heat receiving portion 24 by the abutment portion 36 of the base 31, the pressing force is substantially uniformly distributed along the entire heat receiving portion 24. In other words, since the heat receiving portion 24 can be uniformly brought into contact with the CPU 15, the heat transfer effect can be enhanced.

In addition, since the pressing force of the spring member 28 is not directly applied to the first end 23a of the heat pipe 22, the first end 23a of the heat pipe 22 is not crushed by the spring member 28.

A heat exchanger 46 is arranged at the second end 23b of the heat pipe 22. The heat exchanger 46 is made up of many fins 47 which are arranged at predetermined intervals. The second end 23b of the heat pipe 22 extends through the centers of the fins 47. As shown in FIGS. 3 and 5, the surface of the fin 47 is formed into a parallelogram, and its corners are curved.

The heat exchanger 46 is installed in a fan case 51 which is mounted in the device body 2. As shown in FIG. 5, the fan case 51 is made up of a body 52 and lid 53. The body 52 has a bottom wall 52a and a side wall 52b which stands at the periphery of the bottom wall 52a. The body 52 is open at one end and one surface serves as an upper surface. The lid 53 closes the opening of one surface of the body 52. A plurality of ratchets 54 are arranged at the periphery of the lid 53. The distal ends of the ratchets 54 are bent and engaged with the outer surface of the bottom wall 52a serving as the other surface of the body 52, thereby integrating the body 52 and lid 53.

Figure 4B:
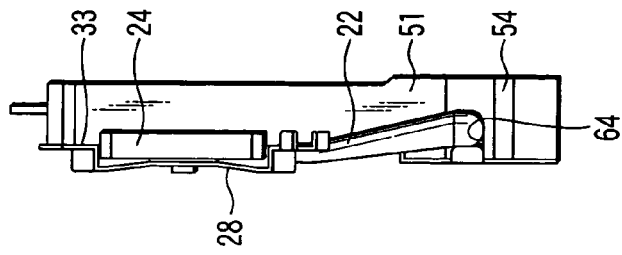
FIG. 4B is a side view showing the example of the cooling device according to the embodiment.

As shown in FIGS. 3 to 5, an opening 55 on the end face and lower surface of the fan case 51 is formed at one end of the fan case 51 assembled by integrating the body 52 and lid 53.

Within the fan case 51, a first container 56 is formed on one end on the side of the opening 55, and a second container 57 is formed on the other end.

The first container 56 contains the heat exchanger 46 while one side surface and the lower surface of the heat exchanger 46 faces the opening 55. In the second container 57, a blower 58 serving as a blowing means integrated with the body 52 of the fan case 51 is arranged while the rotation axis is set perpendicular to the plate surface of the bottom wall 52a of the body 52. The opening 55 faces an exhaust port 59 (shown in FIG. 1) which is formed in the side wall of the case 3 of the device body 2.

When energized, the blower 58 rotates, introduces outside air into the fan case 51 from a suction port 61 formed in the lid 53, and supplies air toward the heat exchanger 46.

Heat of the CPU 15 that is transferred from the first end 23a to second end 23b of the heat pipe 22 via the heat receiving portion 24 is dissipated outside the device body 2 from the heat exchanger 46 via the exhaust port 59.

The heat pipe 22 extends through the side wall 52b of the body 52 of the fan case 51. That is, a through groove 64 serving as the first support whose lower portion has an arcuate shape to pivotally support the heat pipe 22 is formed at a portion of the side wall 52b at which the first container 56 for containing the heat exchanger 46 is formed.

The distal end of the second end 23b of the heat pipe 22 projects from the heat exchanger 46, and the projection is supported by a catch groove 65 serving as the second support which is formed in the first container 56 of the fan case 51.

The heat pipe 22 is curved at the curved portion 23c so that the first and second ends 23a and 23b form almost 90°. Compared to a heat pipe 22, which is straight in form, the distance between the heat receiving portion 24 which is arranged at the first end 23a of the heat pipe 22 and the fan case 51 which is arranged at the second end 23b and houses the heat exchanger 46 can be shortened. That is, the cooling device 21 can be made compact.

Figure 4A:
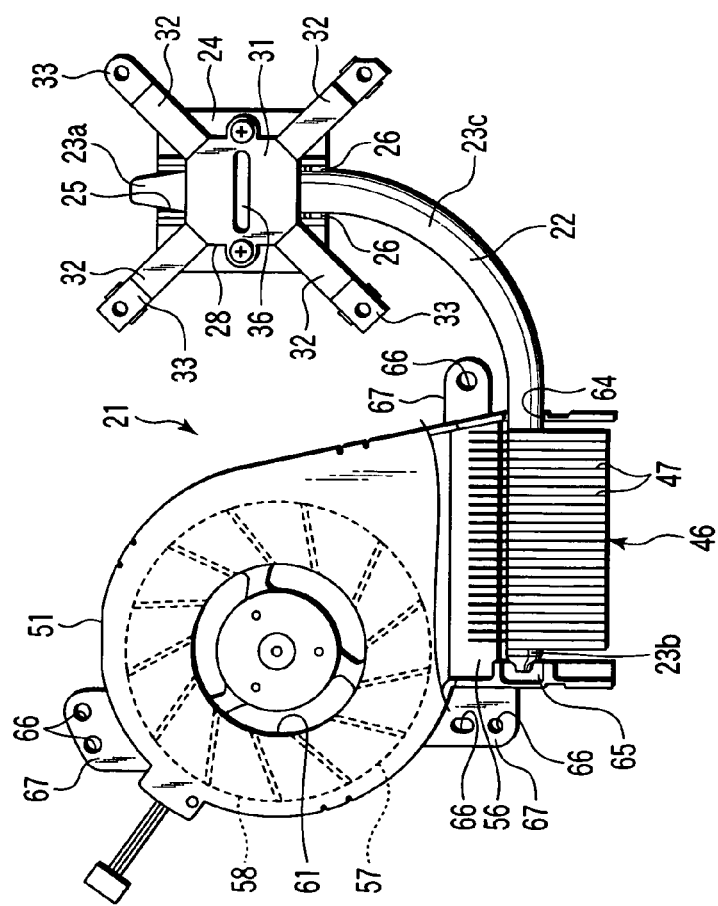
FIG. 4A is a plan view showing an example of the cooling device according to the embodiment.
Figure 4C:
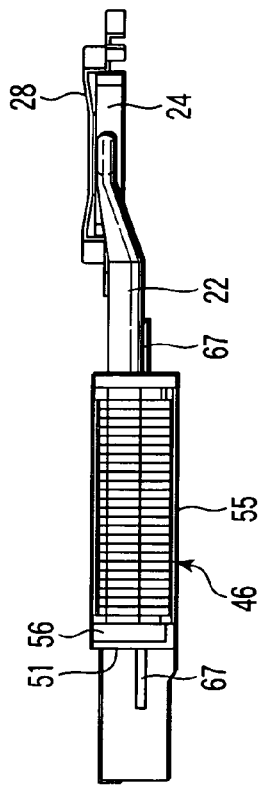
FIG. 4C is a front view showing the example of the cooling device according to the embodiment.

As shown in FIGS. 4A and 4C, the fan case 51 has a plurality of attaching portions 67 each having an attaching hole 66. As shown in FIG. 6, the fan case 51 is attached and fixed by screws 69 to studs 68 formed on the device body 2.

In the portable computer 1 having this structure, to incorporate the cooling device 21 in the device body 2, the fan case 51 of the cooling device 21 is attached and fixed by the screws 69 to the studs 68 on the device body 2 via the attaching portions 67 of the body 52.

Then, the heat receiving portion 24 attached to the first end 23a of the heat pipe 22 is opposed to the CPU 15 on the wiring board 13. The legs 32 of the spring member 28 which is attached in advance to the heat receiving portion 24 with a backlash are fixed by the screws 42 to the studs 41 of the wiring board 13. Consequently, the cooling device 21 is mounted in the device body 2.

FIG. 8 is a block diagram showing the configuration of the electronic device according to the embodiment.

The CPU 15 is a processor which performs overall control of the electronic device, and executes, e.g., various processes in accordance with various programs.

A north bridge 71 is a bridge device having an interface function with the CPU 15, a hub interface function with a south bridge 74, a function of controlling a memory 72, and a function of controlling a VGA controller 73.

The memory 72 corresponds to a main memory which stores an OS (Operating System), various programs, drivers, and the like, and used as the work area of the CPU 15.

The VGA controller 73 incorporates a VRAM (Video Random Access Memory) for reading and writing drawing data, and an LVDS (Low Voltage Differential Signaling) (Tx) processor for performing LVDS. In accordance with a signal supplied from the north bridge 71, the VGA controller 73 controls to generate a video signal (generally an LVDS signal) which can be displayed on a display device (LCD 12 or the like), and output the generated video signal to a line 86 or 79. The VGA controller 73 is connected to an interface for outputting a video signal to a CRT (Cathode Ray Tube), and an interface for outputting an S video signal.

The LCD 12 comprises an LVDS (Rx) processor for processing an LVDS signal. The LCD 12 displays information such as an video image on the basis of an LVDS signal sent from the VGA controller 73 or a high-quality video engine (HVG) 82 via a switch 88 or the like.

A TMDS (Rx) processor 80 converts a 24-bit RGB signal (TMDS (Transition Minimized Differential Signaling) signal) sent from the VGA controller 73 via the line 79 into a digital signal, and outputs the digital signal to a line 81.

The high-quality video engine 82 comprises a VRAM 83, and performs image processes for improving the image quality (mainly processes of improving the sharpness, color correction, and response speed) for a 24-bit RGB signal sent from the TMDS (Rx) processor 80 via the line 81. The high-quality video engine 82 converts the processed signal into an 18-bit RGB signal, and outputs the 18-bit RGB signal to a line 84.

An LVDS (Tx) processor 85 converts the 18-bit RGB signal sent from the high-quality video engine 82 via the line 84 into an LVDS signal, and outputs the LVDS signal to a line 87.

The switch 88 is controlled by the BIOS or the like so as to switch the signal input destination between the lines 86 and 87. The switch 88 outputs an input signal to the LCD 12.

The south bridge 74 is a bridge device having a hub interface function with the north bridge 71, a function of controlling various connected devices, a function of controlling an LPC (Low Pin Count) bus, and a function of controlling a PCI (Peripheral Component Interconnect) bus.

A BIOS-ROM 75 is a memory which stores a BIOS (Basic Input/Output System).

A hard disk drive (HDD) 76 stores an OS, various programs, data, and the like.

An optical disk drive (ODD) 77 drives, e.g., a DVD (Digital Versatile Disk) which records video contents and the like.

A TV tuner unit 78 comprises a TV tuner, an NTSC/PAL (National Television System Committee/Phase Alternation by Line) decoder, MPEG-2 encoder, antenna, and the like, and acquires TV video contents.

An EC/KBC (Embedded Controller/Keyboard Controller) 90 is configured by integrating an embedded controller EC and keyboard controller, and performs power management, a process for a signal from an input device, and the like.

The EC/KBC 90 performs power management of various elements in the electronic device on the basis of various types of information held in an internal register. For example, the EC/KBC 90 controls a power supply state/power saving state/power stop state for circuit elements in accordance with a designated display mode (to be described later). The EC/KBC 90 detects an operation to a power switch 91 and a signal output from a 3D acceleration sensor 92, executes a corresponding process, and notifies each unit of a message to this effect.

The power switch 91 is used to power on/off the electronic device body.

A keyboard 94 and touchpad 95 are input devices which send, to the EC/KBC 90, signals corresponding to input operation.

A power supply controller (PSC) 93 controls power to be supplied to various elements in the electronic device, and is controlled by the EC/KBC 90 via an I²C bus. The power supply controller 93 is connected to an AC adaptor 97, and can use an AC power supply. A battery 96 is a rechargeable battery, and is used when no AC power supply is used.

The 3D acceleration sensor 92 is used to detect the posture of the computer 1. The acceleration sensor 92 is incorporated in the device body 2 (not shown). The acceleration sensor 92 is preferably arranged near the heat receiving portion 24, but the position of the acceleration sensor 92 is arbitrary, as long as the acceleration sensor 92 is incorporated in the device body 2. A method of detecting the posture of the computer 1 by the acceleration sensor 92 is described in detail in Japanese Patent Application No. 2004-366875, and a description thereof will be omitted. Japanese Patent Application No. 2004-366875 describes in detail a method of detecting the free fall of a computer body by a similar 3D acceleration sensor and retracting the head of an HDD to protect the HDD. By using the 3D acceleration sensor 92 similar to the 3D acceleration sensor described in Japanese Patent Application No. 2004-366875, the posture of the device body 2 can be detected to detect whether the top heat state (the end 23a (on the side of the heat receiving portion) of the heat pipe 22 is positioned higher than the end 23b (on the radiating side)).

Control of the computer 1 when the acceleration sensor 92 detects the top heat state of the computer 1 will be explained.

Figure 9:
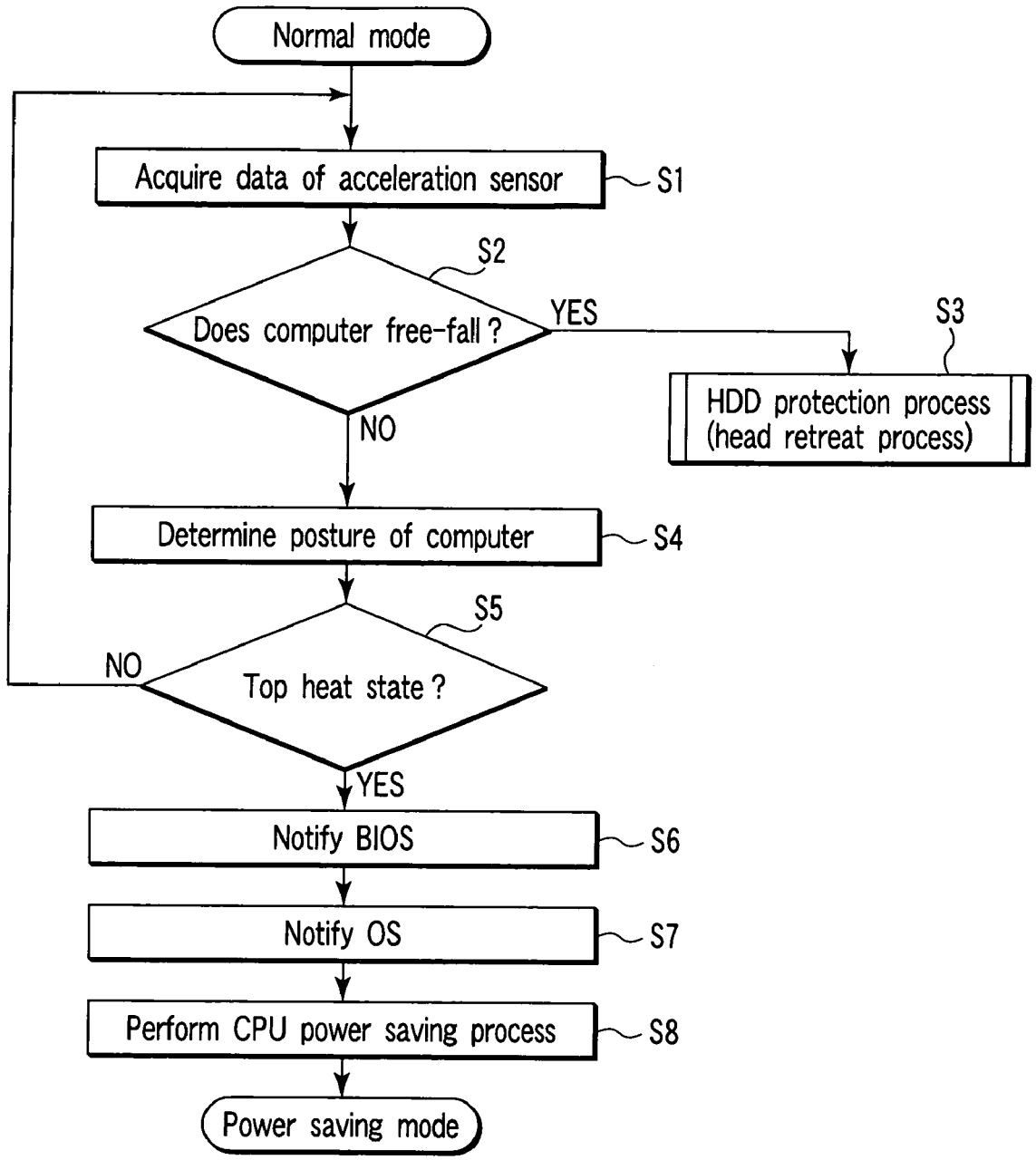
FIG. 9 is a flowchart showing an example of a control flow when a CPU is in a normal mode according to the embodiment.

Control when the CPU 15 is in a normal mode will be explained. FIG. 9 is a flowchart showing control when the CPU 15 is in the normal mode.

The acceleration sensor 92 always detects the posture of the computer 1. The EC/KBC 90 reads data of the acceleration sensor 92 (S1). The EC/KBC 90 determines from the data of the acceleration sensor 92 whether the computer 1 freely falls (S2). If the EC/KBC 90 determines that the computer 1 freely falls (S2: YES), it executes an HDD protection process (S3). As the HDD protection process, the head of the HDD 76 is instantaneously retracted. The method of retracting the head of the HDD 76 on the basis of the acceleration sensor 92 is the same as that described in Japanese Patent Application No. 2004-366875, and a description thereof will be omitted.

If the EC/KBC 90 determines that the computer 1 does not freely fall (S2: NO), it determines the posture of the computer 1 (S4). The EC/KBC 90 determines whether the computer 1 is in the top heat state, i.e., one end 23a (on the side of the heat receiving portion) of the heat pipe 22 is higher than the other end 23b (on the side of the radiating portion) (S5). If the EC/KBC 90 determines that the computer 1 is not in the top heat state (S5: NO), steps S1 to S5 are repeated.

If the EC/KBC 90 determines that the computer 1 is in the top heat state (S5: YES), it notifies the BIOS stored in the BIOS-ROM 75 of a message to this effect (S6). The BIOS which is notified from the EC/KBC 90 that the computer 1 is in the top heat state notifies the OS (Operating System) of the message to this effect (S7). The OS sets the CPU 15 to the power saving mode by an existing means such as the power saving utility of the OS, and sets the computer 1 to the power saving mode (S8). Examples of the power saving mode of the CPU are "CPU throttling function" and "Geyserville function" which is provided as a standard function of a CPU available from Intel.

1) "CPU Throttling Function"

The "CPU throttling function" is a function of switching the average CPU processing speed by performing intermittent operation of operating/stopping the CPU 15 at a predetermined interval. The "CPU throttling function" is also called an interval stop clock function or intermittent operation function. A state in which the "CPU throttling function" is disabled, i.e., the CPU 15 always operates corresponds to the maximum performance of the CPU 15. A state in which the "CPU throttling" is enabled by an arbitrary percentage corresponds to lower performance. The CPU performance can be controlled in multiple stages by changing the ratio of the stop state to the active state.

2) "Geyserville Function"

The "Geyserville function" is given to a CPU available from Intel, and is a function of dynamically switching the operating frequency and voltage of the CPU. A state in which a high operating frequency and voltage supported by the CPU are set corresponds to the maximum performance of the CPU. A state in which a low operating frequency and voltage are set corresponds to lower performance.

Regardless of which of functions 1) and 2) is used, the CPU performance can be switched by writing necessary data in the internal register of a CPU speed control circuit (not shown) that is incorporated in the north bridge 71. In both 1) and 2), the CPU 15 is driven in the power saving mode requiring small power consumption. That is, the heat generation amount from the CPU 15 decreases. In this case, the heat amount transferred to the end 23a of the heat pipe 22 on the side of the heat receiving portion can become smaller than the heat transfer ability of the heat pipe 22. Even when the computer 1 is in the top heat state, it can operate stably while the CPU 15 is cooled.

Figure 10:
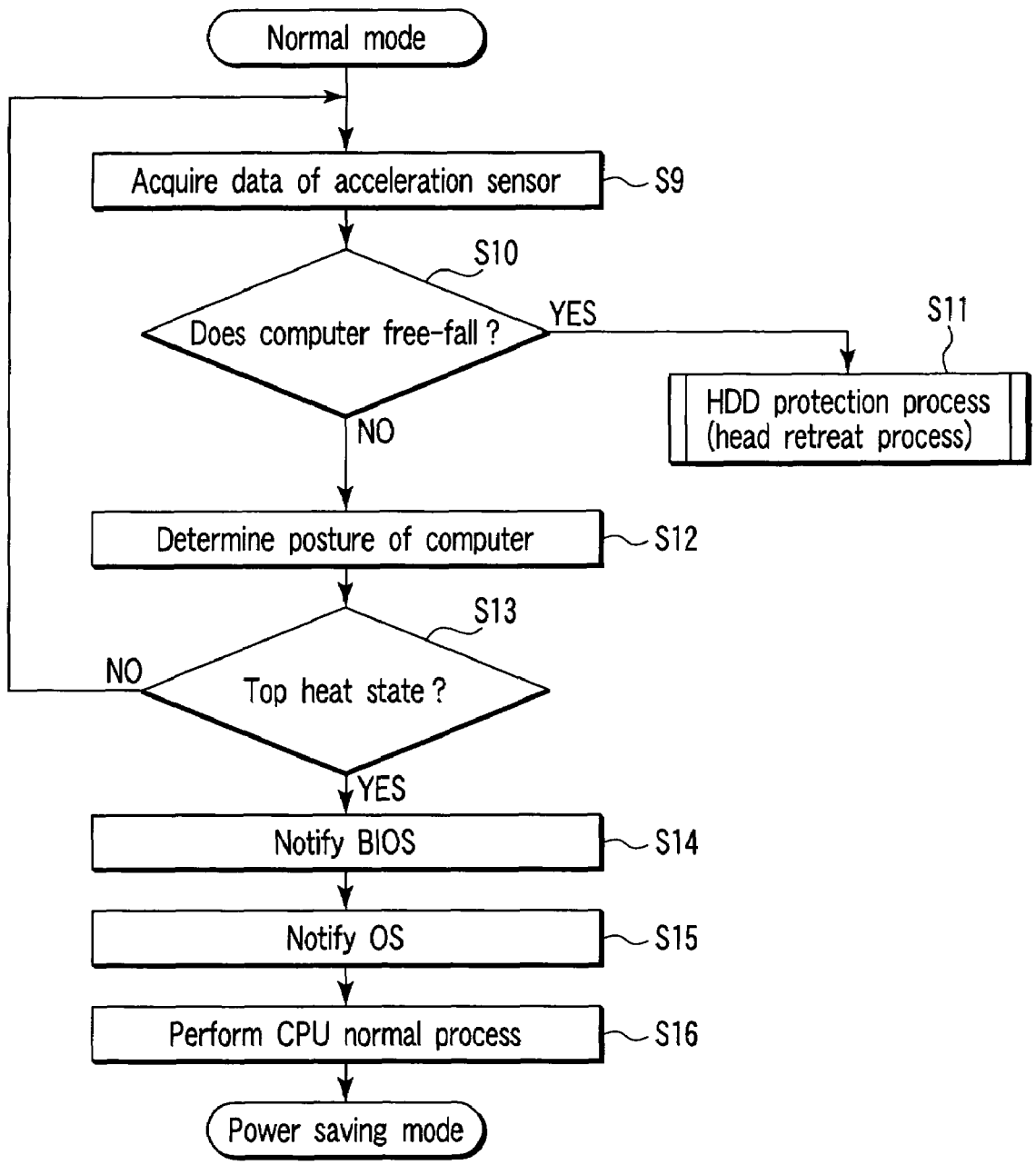
FIG. 10 is a flowchart showing an example of a control flow when the CPU is in a power saving mode according to the embodiment.

Control when the CPU 15 is driven in the power saving mode will be explained. FIG. 10 is a flowchart showing CPU control when the CPU is in the power saving mode.

Similar to the case wherein the CPU 15 is in the normal mode, the acceleration sensor 92 always detects the posture of the computer 1. The EC/KBC 90 reads data of the acceleration sensor 92 (S9). The EC/KBC 90 determines from the data of the acceleration sensor 92 whether the computer 1 freely falls (S10). If the EC/KBC 90 determines that the computer 1 freely falls (S10: YES), it executes an HDD protection process (S11). As the HDD protection process, the head of the HDD 76 is instantaneously retracted.

If the EC/KBC 90 determines that the computer 1 does not freely fall, it determines the posture of the computer 1 (S12). The EC/KBC 90 determines whether the computer 1 is in the top heat state, i.e., one end 23a (on the side of the heat receiving portion) of the heat pipe 22 is higher than the other end 23b (on side of the radiating portion) (S13). If the EC/KBC 90 determines that the computer 1 is in the top heat state (S13: YES), steps S9 to S13 are repeated while the CPU is kept driven in the power saving mode.

If the EC/KBC 90 determines that the computer 1 is not in the top heat state (S13: NO), it notifies the BIOS stored in the BIOS-ROM 75 of a message to this effect (S14). The BIOS which is notified from the EC/KBC 90 that the computer 1 is not in the top heat state notifies the OS of the message to this effect (S15). The OS sets the CPU 15 from the power saving mode to the normal mode, and sets the computer 1 to the normal mode (S16).

By the above-described control, while the user carries the computer 1 with him, it can be quickly determined that the computer 1 which has been driven in the power saving mode is placed on the desk or the lap of the user and returns to a normal use form. Operation of the CPU 15 can be automatically switched from the power saving mode to the normal mode. The user can use the computer 1 without any stress.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a body which incorporates a CPU;
   a sensor which is incorporated in the body and detects a posture of the body; and
   a controller which performs power saving control of the CPU in accordance with detection of the posture of the body by the sensory,
   wherein:
   the body includes a heat pipe which has a heat receiving end, arranged close to the CPU, that receives heat of the CPU and a radiating end opposed to the heat receiving end;
   the sensor detects a state in which the radiating end is lower than the heat receiving end; and
   the controller shifts the CPU to a power saving mode when the sensor detects the state in which the radiating end is lower than the heat receiving end.

2. A device according to claim 1, wherein the power saving control of the CPU is performed by controlling a clock of the CPU.

3. A device according to claim 1, wherein the sensor includes a 3D acceleration sensor.

4. An electronic device according to claim 3, wherein when the CPU is in the power saving mode:
   (a) the 3D acceleration sensor detects a posture of the body;
   (b) the controller detects whether the body falls freely, based on data of the 3D acceleration sensor;
   (c) the controller protects the electronic device when the controller determines that the body falls freely;
   (d) the 3D acceleration sensor detects whether the radiating end is lower than the heat receiving end when the controller determines that the body does not fall freely;
   (e) the steps (a) to (d) are repeated while the CPU is being driven in the power saving mode when the 3D acceleration sensor detects that the radiating end is lower than the heat receiving end; and
   (f) the controller shifts the CPU from the power saving mode to a normal mode when the 3D acceleration sensor detects that the radiating end is not lower than the heat receiving end.

5. A power saving control method for a CPU incorporated in a body of an electronic device, the body including a heat pipe which has a heat receiving end, arranged close to the CPU, that receives heat of the CPU and a radiating end opposed to the heat receiving end, the method comprising:
   detecting a posture of the electronic device by a 3D acceleration sensor incorporated in the body; and
   shifting the CPU to a power saving mode when the 3D acceleration sensor detects a state in which the radiating end is lower than the heat receiving end,
   wherein when the CPU is in the power saving mode:
   (a) the 3D acceleration sensor detects a posture of the body;
   (b) a controller of the electronic device detects whether the body falls freely, based on data of the 3D acceleration sensor;
   (c) the controller protects the electronic device when the controller determines that the body falls freely;
   (d) the 3D acceleration sensor detects whether the radiating end is lower than the heat receiving end when the controller determines that the body does not fall freely;
   (e) the steps (a) to (d) are repeated while the CPU is being driven in the power saving mode when the 3D acceleration sensor detects that the radiating end is lower than the heat receiving end; and
   (f) the controller shifts the CPU from the power saving mode to a normal mode when the 3D acceleration sensor detects that the radiating end is not lower than the heat receiving end.

* * * * *